United States Patent
Kilbride et al.

(10) Patent No.: US 11,903,383 B2
(45) Date of Patent: Feb. 20, 2024

(54) CRYOPRESERVATION METHOD AND APPARATUS

(71) Applicant: Asymptote Ltd., Cambridgeshire (GB)

(72) Inventors: Peter Kilbride, Cambridgeshire (GB); George John Morris, Cambridgeshire (GB)

(73) Assignee: Asymptote Ltd., Cambridge (GB)

( * ) Notice: Subject to any disclaimer, the term of this patent is extended or adjusted under 35 U.S.C. 154(b) by 737 days.

(21) Appl. No.: 16/652,831

(22) PCT Filed: Oct. 12, 2018

(86) PCT No.: PCT/EP2018/077916
§ 371 (c)(1),
(2) Date: Apr. 1, 2020

(87) PCT Pub. No.: WO2019/073051
PCT Pub. Date: Apr. 18, 2019

(65) Prior Publication Data
US 2020/0229427 A1 Jul. 23, 2020

(30) Foreign Application Priority Data
Oct. 12, 2017 (GB) .................................... 1716729

(51) Int. Cl.
*A01N 1/02* (2006.01)

(52) U.S. Cl.
CPC ......... *A01N 1/0257* (2013.01); *A01N 1/0268* (2013.01); *A01N 1/0284* (2013.01); *A01N 1/0289* (2013.01)

(58) Field of Classification Search
CPC .. A01N 1/0257; A01N 1/0268; A01N 1/0284; A01N 1/0289
See application file for complete search history.

(56) References Cited

U.S. PATENT DOCUMENTS

| 5,309,722 A | * | 5/1994 | Phillips, Jr. | ............... F25D 3/10 62/52.1 |
| 5,475,983 A | * | 12/1995 | Yamamoto | ............... F25D 3/04 62/383 |

(Continued)

FOREIGN PATENT DOCUMENTS

| WO | 2009/143364 A1 | 11/2009 |
| WO | 2009143346 A2 | 11/2009 |
| WO | 2016/166548 A1 | 10/2016 |

OTHER PUBLICATIONS

PCT International Search Report and Written Opinion for PCT Application No. PCT/EP2018/077916 dated Dec. 19, 2018 (10 pages).

(Continued)

*Primary Examiner* — Filip Zec
(74) *Attorney, Agent, or Firm* — Eversheds Sutherland (US) LLP (57) ABSTRACT

The present invention relates to methods and apparatus for the cryopreservation of biological samples involving a density assisted vitrification wherein a sample of biological material in a cryopreservation agent is cooled from its top surface, causing an ice layer to form thereon. As cooling continues the ice layer grows downwards through the sample to provide a cryoprotectant and biological material rich layer below the ice layer that undergoes vitrification as cooling continues to below the glass transition temperature.

26 Claims, 4 Drawing Sheets

(56) References Cited

U.S. PATENT DOCUMENTS

| | | | | |
|---|---|---|---|---|
| 5,780,295 | A * | 7/1998 | Livesey | A61K 39/12 |
| | | | | 62/347 |
| 6,167,710 | B1 | 1/2001 | Cosman | |
| 9,943,075 | B2 * | 4/2018 | Ho | A01N 1/0226 |
| 11,154,080 | B2 * | 10/2021 | Meyer | A23L 3/37 |
| 11,311,008 | B2 * | 4/2022 | Bischof | A01N 1/0221 |
| 2010/0216230 | A1 * | 8/2010 | Thorne | A01N 1/0257 |
| | | | | 62/52.1 |
| 2015/0072423 | A1 * | 3/2015 | Li | A01N 1/0221 |
| | | | | 435/374 |
| 2016/0089401 | A1 * | 3/2016 | Woods | A61K 47/26 |
| | | | | 424/93.7 |
| 2017/0030626 | A1 * | 2/2017 | Closs | F25D 3/10 |
| 2019/0313632 | A1 * | 10/2019 | Han | A01N 1/0231 |
| 2020/0178518 | A1 * | 6/2020 | Rubinsky | A01N 1/0284 |

OTHER PUBLICATIONS

GB Search Report for GB Application No. 1617786.7 dated Feb. 27, 2017 (5 pages).
Kramer et al., "Freeze-Drying Using Vacuum-Induced Surface Freezing," Dissolution Profile of Novel Composite Pellet Cores Based on Different Ratios of Microcrystalline Cellulose and Isomatl, Journal of Pharmaceutical Sciences, 2002, 101(8):2675-2680.
Morris et al., "Controlled Ice Nucleation in Cryopreservation—A Review," Cryobiology, 2013, 66:85-92.
Roessl et al., "Protein Freeze Concentration and Micro-Segregation Analysed in a Temperature-Controlled Freeze Container," Biotechnology Reports, 2015, 6:108-111.
Japanese Office Action for JP Application No. 2020-520621 dated Aug. 22, 2022 (4 pages).
Martin, K. "Freeze-drying using vacuum-induced surface freezing," J. of Pharmaceutical Sciences, 2002, 91 (2): pp. 433-443.

* cited by examiner

CRYOPRESERVATION METHOD AND APPARATUS

CROSS REFERENCE TO RELATED APPLICATIONS

This application claims the priority benefit of PCT/EP2018/077916 filed on Oct. 12, 2018, which claims priority to Great Britain Patent Application No. 1716729.7 filed Oct. 12, 2017, the entire contents of which are hereby incorporated by reference herein.

FIELD OF INVENTION

The present invention relates to methods for cryopreservation of biological materials in cryopreservation media involving a density assisted vitrification, apparatus for performing these methods and samples preserved by these methods.

BACKGROUND OF THE INVENTION

Cryopreservation is a technique used for the preservation of biological materials, e.g. biological samples, that involves cooling samples to, and maintaining them for prolonged periods at, very low temperatures, for example −80° C., −136° C. or −196° C. By cooling a biological sample to a low temperature the kinetics of chemical or enzymatic reactions that would otherwise degrade that sample are slowed to such an extent that the sample no longer degrades or only degrades at very slow rate. As a result, biological samples can be stored over prolonged periods and then brought back to ambient temperature as required for use and/or analysis.

The cooling process can, however, have detrimental effects on a biological sample and to mitigate these effects a number of techniques for cryopreservation have been developed, albeit all of these techniques have intrinsic limitations. Traditional cryopreservation techniques involve controlled cooling and results in the formation of ice crystals. An alternative ice free technique, vitrification, avoids the formation of ice crystals during cooling and instead involves solidification of water into an amorphous glass.

Damage to biological samples during cryopreservation processes mainly occurs during the cooling/freezing stage and the warming stage. Solution effects, extracellular ice formation, intracellular ice formation, membrane effects, solute toxicity and dehydration can all lead to sample damage. Some of these effects can be reduced by introducing compounds with known protective impact during the cryopreservation cycle. Compounds with a protective impact during cryopreservation are referred to as cryoprotectants or cryoprotective additives (CPAs).

There are various stresses that a biological sample can encounter during cryopreservation, examples of these stresses and their effects on a cellular level include i) reduction in temperature—can potentially cause changes in the membrane lipid phase and/or depolymerisation of the cytoskeleton; ii) increase in solute concentration, e.g. the concentration of solute in solution increases as a proportion of the solvent freezes—can lead to osmotic shrinkage; iii) increase in ionic concentration—can have a direct effect on membranes including the solubilisation of membrane proteins; iv) dehydration—can cause destabilisation of the lipid bilayers; v) precipitation of salts and eutectic formation—can cause cellular damage though mechanisms not well understood; vi) gas bubble formation—can cause mechanical damage; vii) increase in viscosity—may effect diffusion processes including osmosis; viii) pH changes—can cause denaturation of proteins etc.; and ix) cells become closely packed—can cause membrane damage. There is therefore a need for cryopreservation techniques that minimise exposure of biological samples to these various stresses.

In standard cryopreservation techniques, sometimes referred to as conventional or equilibrium cryopreservation, cells or biomass are cooled at a specific rate in a controlled rate freezer, or by using a simpler passive cooling device. As the sample temperature descends below its equilibrium melting point ice begins to form (on nucleation) and ice crystals then spread from the nucleation point throughout the sample, often causing irreparable damage. As the ice formation process proceeds biological samples such as cells concentrate in solute-dense channels between the ice, until these channels themselves solidify (through vitrification), and the samples are then stored at their designated storage temperatures.

These ice-present cryopreservation techniques are generally considered unsuitable for the preservation of tissues and organs due to the direct ice damage that can occur. In simple terms, ice crystals can expand between, or grow into, cells, causing destruction of the tissue macrostructure and, consequently, the function of the tissue. In practical terms although some extracellular ice can be supported in organs and tissues, intracellular ice is almost always fatal to cells. To date, the only mammalian organs that have been successfully cryopreserved in an ice-present system are sheep ovaries, and these are notably much smaller than most organs or indeed tissue-engineered constructs (see Campbell et al, Human Reproduction 2014 August; 29(8): 1749-1763).

Although conventional cryopreservation is a proven technique for a large number of applications, its application is generally restricted to suspensions of cells or small aggregates. For biopsy samples greater than 1 $mm^3$ in volume such as tissues, organs, or multicellular organisms, unacceptable damage to the material occurs during the freezing and thawing due to ice damage.

Vitrification, in contrast to equilibrium cryopreservation, is an ice-free cryopreservation technique. Various mechanisms are exploited in vitrification to avoid ice growth on cooling. Vitrification relies on bringing a sample resident in a vitrification/cryopreservation medium to below the glass transition temperature (Tg) of that vitrification/cryopreservation medium without allowing ice crystals to form. At temperatures below the glass transition temperature the viscosity of the system increases and the solvent/medium eventually solidifies to deliver a stable sample in which the biological material resides within a low temperature matrix of amorphous solid vitrification/cryopreservation medium.

Cryopreservation through vitrification usually entails adding a cryoprotectant (CPA) containing cryopreservation medium to a biological sample prior to cooling that reduces the freezing temperature of the medium and aqueous components of the sample and also increases the viscosity of the aqueous components of the sample so that ice crystal formation during cooling below the equilibrium freezing point is avoided and the transition from the liquid to the solid state does not involve crystallisation. Vitrification of biological samples however typically requires rapid cooling, for example cooling rates of 10,000° C./min or more and this intrinsically limits the approach to very small sample sizes. Typically, vitrification samples are presented in a straw with an internal diameter of 1 mm or less. Successful cryopreservation of larger samples by vitrification with the techniques that form the state of the art is very difficult or impossible.

Vitrification may also be achieved with a combination of rapid cooling and simultaneous application of high pressure, but this involves high cost and requires skilled operators. Addition of high concentrations of solutes such as dimethylsulphoxide (DMSO) in the vitrification process before cooling can be useful, however toxicity of the resultant solutions to biological samples is often observed, while perfusion/diffusion of these high-viscosity liquids into complex tissues can be difficult.

A further approach to vitrification, known as progressive lowering of temperature (PLT) or liquidus tracking, involves increasing the concentration of a cryoprotectant such as DMSO into the cryopreservation medium during cooling to prevent ice formation and to reduce, or eliminate, any toxicity associated with the ultimate concentration of CPA achieved in the liquidus tracking approach that would be manifest before cooling commences (e.g. at ambient temperature), to ultimately deliver a vitrified sample as the cooling continues. Although this technique was first proposed in theory in the 1960's successful practical application of the technique for clinical samples has still not been achieved due to various technical difficulties. Primary reasons for the failure of this approach to develop into a successful technique are the time required for the process to progress, and the extremely high viscosities encountered with high solute concentrations at low temperatures. For example, the viscous liquids encountered at low temperatures, for example aqueous solutions with a high concentration of DMSO, become very difficult to pump and no commercial equipment exists to implement this method. To date, liquidus tracking has primarily been carried out in a step-wise manner. Samples are added to a CPA solution, which is then lowered to just above its freezing point. The samples are then moved to a solution with a higher CPA concentration (and so lower freezing point), which is then cooled to the new freezing point, and this is continued until the sample is at a concentration sufficient for vitrification. In this stepwise approach issues associated with carryover of solutes are encountered. In addition, the diffusion of cryoprotectants into biological samples at low temperatures that is necessary to achieve vitrification of the whole sample becomes rate limiting. Liquidus tracking is also difficult to carry out under sterile conditions, despite this being a requirement for preservation of biological specimens.

Vitrification (ice free cryopreservation) of mammalian embryos and oocytes in small volumes of liquid has been demonstrated to be effective at retaining cell viability and function. However, despite extensive research, vitrification of larger biological samples to retain structure, viability and function upon warming has not been demonstrated, primarily this appears to be a result of the practical difficulties in achieving rapid enough cooling/warming rates, avoiding ice nucleation and minimising cryoprotectant toxicity.

Many tissues and tissue engineered organs do not have any shelf life after removal from a patient or culture. This leads to waste and damages the economy of techniques using these materials, and as such Just-in-Time manufacture is usually not feasible for tissue engineered constructs. Methods for better preservation, such as those described herein, are therefore required.

Biopsies have many direct medical applications, commonly clinical biopsies are "rapidly" frozen after harvesting and then sectioned in a cryostat, however massive ice damage makes interpretation of structure very difficult and recovery of viable cells impossible. Alternatively, biopsies can be chemically fixed, leading to better retention of the sample ultrastructure but, detrimentally, the fixatives presently used often interfere with staining methods, especially those which recognise the antigenicity of proteins, and no cell viability is recoverable from the chemically fixed cryopreserved sample. These current methods limit the scope and type of diagnostic examinations that can be performed on biopsies after cryopreservation and so the diagnostic tests commonly have to be decided prior to preservation.

It is an object of the present invention to provide an improved method of cryopreservation that is suitable for the preservation of biological samples, in particular tissue samples such biopsies and tissue constructs that often cannot be cryopreserved with existing techniques. It is also an object of the invention to provide apparatus in which the cryopreservation methods according to the invention can be performed. It is envisaged that the methods of the invention, through delivering better preserved biomass, will enable biobanks where samples can be examined for a wide range of applications and enable stratified medicine approaches even at extended periods after the samples are taken.

SUMMARY OF THE INVENTION

In a first aspect the invention provides a method for cryopreservation of a sample comprising biological material in a cryopreservation medium which is initially liquid, comprising the step of cooling the top surface of the sample to selectively form an ice layer at the top surface of the sample. The cooling applied the top surface of the sample is continued until a layer of the sample below the ice layer solidifies as a glass, thus delivering a vitrified composition of biological material in the cryopreservation medium. Preferably, cooling progresses through a thermally conducting member, which is preferably located centrally of the sample liquid, which homogenises the temperature in the majority of the sample's remaining liquid component. The method involves a progressive directional formation of ice from the top surface of the sample towards the base of the sample. The methods according to the invention can be used for the cryopreservation of a wide range of biological materials for example biopsies or other tissues, artificial tissue constructs, proteins, antibodies, or cells.

In some embodiments the method further comprises the step of cooling a layer of the sample underneath the ice layer to a temperature close to but above that of the ice layer, for example a temperature of less than 5° C. different to that of the ice layer, for example from 0.1° C. to 5° C. different to that of the ice layer. This secondary cooling of the sample below the ice layer can advantageously enhance the gravitationally driven segregation of cryoprotectant and biological material in the cryopreservation medium due to the minimization of temperature-dependant density gradients. The cryopreservation medium may be an aqueous solution containing at least one cryoprotectant selected from dimethyl sulfoxide, formamide, acetamide, C1-C3 alcohols, 1,2-isopropyldiol, 1,2-propanediol, ethylene glycol, propylene glycol, glycerol, glucose, mono-saccharides, disaccharides (for example sucrose, trehalose, lactose), polysaccharides (for example raffinose, dextran), ficoll, polyethylene glycol and polyvinylpyrollidine. In some preferred cases the cryopreservation medium comprises DMSO, or a sugar (e.g. glucose), or a combination of DMSO and a sugar. In some preferred embodiments the cryoprotectant is selected from DMSO, glycerol, glucose, raffinose, sucrose, lactose, fructose, methanol, and ethylene glycol. In some embodiments the cryopreservation medium is an aqueous solution comprising from 5% w/v to 20% w/v of a CPA or a combination of CPAs in water.

In some preferred embodiments, the thermally conducting fed member i-partially insulated and extends through the cryopreservation medium, which member may extend from the surface of the sample being cooled to above the base of the sample, for example 25-65 mm or more preferably about 45 mm above the base. This ensures that the sample at the base is kept close to, but above, the temperature of the ice-liquid sample interface. In some embodiments the member acts as a surface for the nucleation of ice. In some embodiments the central rod member acts as a surface from which ice can grow, increasing the area of the ice to liquid sample interface.

In some embodiments, a heavy solute is introduced into the cryopreservation medium to assist in gravitationally-induced freeze segregation, for example a molecule with a density >2 g/cm$^3$. In some embodiments the heavy solute is selected from any one or more of Caesium Bromide, Caesium Iodide, Europium Chloride, Indium Chloride, Samarium Chloride, and salts of halogens. In preferred embodiments these heavy solutes have a high solubility in water, such that >0.5 g of the solute is dissolvable in 1 ml of water at 4° C. In preferred embodiments these heavy solutes have non-damaging impacts on cells or is not detrimental to human health if used in therapy.

In some preferred embodiments, a vesicle is used holding the sample during freezing, and preferably the vesicle has dimensional flexibility to enable it to withstand the higher forces and/or pressures present when ice forms. In some embodiments the vesicle consists of smooth or treated internal walls to allow the ice layer(s) to move relative to the walls in response to force/pressure increases caused by the expansion of ice crystals.

In some embodiments the methods according to the invention further comprise the step of adding additional cryoprotectant to the layer of the sample below the ice layer after the ice front on the top surface of the sample has formed. The invention thus provides a practical method of liquidus tracking for the preservation of clinically relevant samples such as biopsies and tissue constructs in which case the additional cryoprotectant is added in a progressive fashion as a function of the decrease in temperature of the ice layer or the layer below the ice layer.

The methods according to the invention involve cooling rates that are typically less than 5° C. per minute, for example in the range of from 0.05 to 5° C. per minute, preferably between 0.1 to 2° C. per minute. In some embodiments a 'hold' in the cooling process can be enacted close to but below the freezing point of the sample, for example between 1 hour and 4 hours at −7° C.

The methods according to the invention can also involve applying mechanical agitation to the sample during cooling, for example by stirring, shaking or sonicating.

In a further aspect the invention provides a cryopreservation apparatus for performing a cryopreservation method according to any preceding claim. The apparatus according to the invention comprises a housing, the housing comprising a cavity and a primary cooling element in the form of a thermally conductive member inserted or insertable into the cavity, or forming part of the roof of the housing which is above the cavity, in any case, being arranged to extend into an upper portion of the of the cavity, and preferably to be absent from a lower portion the cavity. The housing of the apparatus is generally thermally insulated.

In the cryopreservation apparatus the degree of cooling provided by the primary cooling element can be controlled manually or automatically by a control unit. A connector for attachment to a sensor adapted to provide a signal characteristic of the physical condition of a sample located in the cavity can be provided to connect with a sensor located in the cavity, for example in a sample container located within the cavity.

Any sensor or sensors located in the cavity advantageously provide a signal characteristic of the physical condition of a sample located in the cavity and are generally electrically connected to a control unit that can receive a signal from the sensor and in response to the signal can control the cooling provided to the sample. The signal can for example indicate the presence of an ice layer in, or the temperature of, or the resistivity/conductivity of, a sample located in the cavity.

The cavity in the apparatus may comprise inlet and outlet ports. Additional cryoprotectant can be added to a biological material located within the cavity via the inlet port, or can be removed via the outlet port. Supply of additional cryoprotectant to the biological material, optionally wherein the cryoprotectant is provided in aqueous solution, can be controlled a pump configured to supply fluid to the inlet port, for example by pushing fluid to, or drawing fluid towards, the inlet port. The additional CPA may be introduced in accordance with a preset algorithm correlating a sensor reading with the rate of addition of extra CPA advantageously allowing a fully automated vitrification process to be performed.

In some embodiments fluid flow to the inlet port is controlled by the control unit in response to a signal received from a sensor located in the cavity, such apparatus are useful for liquidus tracking techniques of cryopreservation. The apparatus according to the invention may also comprise means for mechanically agitating a sample located within the cavity, for example by stirring, shaking or sonicating. In some preferred embodiments the cryopreservation apparatus comprises a secondary cooling element adapted to cool a section of the wall(s) or floor of the cavity. The secondary cooling element can speed the cryopreservation process by encouraging the gravity driven segregation of biological material and cryoprotectant from the ice front. In use the secondary cooling element cools the portion of the sample below the ice front to a temperature just above that of the ice layer in the sample, and is generally only initiated once the ice front has formed at the top of the sample and, in any case, only cools the sample to temperature below 0° C. once the ice front at the top surface of the sample has been formed. The extent and rate of cooling provided by the secondary cooling element can be controlled by a control unit, for example to match a pre-programmed cooling algorithm.

In a further aspect the invention also provides a cryopreserved sample obtained by a method according to the invention, or produced in an apparatus according to the invention. The cryopreserved sample of biological material according to the invention may be a biopsy or other tissue, an artificial tissue construct, proteins, antibodies or cells.

BRIEF DESCRIPTION OF THE FIGURES

The present techniques are diagrammatically illustrated, by way of example, in the accompanying drawings, in which.

DETAILED DESCRIPTION

In the cryopreservation methods according to the invention, as is conventional in the field of cryopreservation, biological material is preserved in an aqueous solution that contains a solute that serves as a cryopreservation agent (a cryoprotectant/CPA). The aqueous solution of cryoprotectant is referred to herein as a cryopreservation medium (CPM). The term sample is used herein to refer to biological material in a cryopreservation medium. The biological material may be, for example, a biopsy or other tissue, an artificial tissue construct, proteins, antibodies, or cells.

At the initiation of the cryopreservation methods according to the invention the biological material and cryopreservation medium are combined at a temperature between 0° C. and body temperature, for example between 0° C. and room temperature. The biological material can be immersed in, or suspended, the cryopreservation medium as appropriate to the nature of the biological material. The resultant sample for cryopreservation, i.e. the biological material in cryopreservation medium herein referred to simply as the sample, is then cooled to form, in the first phase, a substantial pure volume of crystalline ice that grows downward from the upper surface and the surface of, for example aided by a thermally conducting member described in more detail below, in one embodiment in the form of a central rod and, in due course, a vitrified layer comprising the biological material in a matrix of cryopreservation medium that is enriched in cryoprotectant, i.e. that contains a higher concentration of cryoprotectant relative to the cryopreservation medium at the start of the cryopreservation process.

The cryopreservation techniques according to the invention achieve a segregation of biological sample and cryoprotectant by establishing a gravity driven concentration, and, optionally, a temperature gradient, across the sample. The establishment of a gravity driven concentration and temperature gradient across the sample (for cryopreservation) is achieved by placing the sample in a chamber (i.e. a freezing chamber or cavity that is cooled during the cryopreservation process) and, in the first cooling phase of the technique, applying cooling selectively to the top surface of the sample thereby causing ice formation thereon.

The layer of ice that forms on the central rod and upper surface of the sample is "pure" ice, i.e. ice that is substantially or completely free of solute (i.e. cryoprotectant and biological material). As a result of the removal of water as ice from the cryopreservation medium and the expulsion of solute from the nascent ice layer there is an increase in the bulk concentration of solute (cryoprotectant and biological sample) in the unfrozen portion of the sample and a local increase in the concentration of solute cryoprotectant (and any biological sample) in the cryopreservation medium immediately below the newly formed ice. This event causes an increase in the density of the layer of cryopreservation medium directly below the ice front and, under the influence of gravity, this denser portion of the cryopreservation medium will sink towards the bottom of the sample. A gravitational driven concentration gradient of solute is thus established as the cooling, freezing, segregation, sinking cycle repeats.

As cooling to the upper surface of the sample is maintained the ice layer continues to grow downwards into the sample, and outwards from the central rod. At the same time, the cryoprotectant concentration in the unfrozen sample layer below the ice front increases. The resultant increased concentration of solute in the unfrozen cryopreservation medium disfavours ice formation in the sample other than at the ice front because the freezing point of the unfrozen cryopreservation medium drops as the cryoprotectant concentration in the cryopreservation medium increases. Eventually the directional, higher to lower, ice growth delivers a layer in sample below the ice layer that is rich in cryoprotectant and biological material that has a freezing point below the glass transition temperature (Tg). This portion of the sample will vitrify on continued cooling to deliver a cryopreserved sample.

In contrast to conventional cryopreservation techniques in which cryoprotectant rich channels between ice zones are formed, the layer that is rich in cryoprotectant and biological material that has a freezing point below the glass transition temperature (Tg) in the methods of the present invention, that is located below the ice front, is suitable for preservation of relatively large samples without significant ice damage. In addition, and in contrast to the vitrification methods that form part of the state of the art, the methods of the present invention do not require extremely rapid cooling rates or the application of pressure. The methods of the present invention thus deliver the opportunity for successful cryopreservation of biological samples that are too large for preservation with conventional cryopreservation and vitrification approaches. For example, samples with a size of greater than 1 $mm^3$ can be cryopreserved with the methods of the invention.

In preferred embodiments the cryopreservation method according to the invention comprises a second cooling phase that commences after an ice layer has been established at the top of the sample.

In an optional embodiment of the second cooling phase, in addition to cooling the sample on its uppermost surface, additional cooling to the sample in the freezing chamber is applied. This additional cooling is generally applied to the volume of the freezing chamber below surface of the sample, i.e. by cooling at the wall or floor of the freezing chamber or a portion of the wall or floor, only after the ice front at the top of the sample has been established. In any case, the additional cooling in itself is not sufficient to cause freezing of ice and ice formation is always initiated and sustained by the primary cooling provided to the top surface of the sample during cryopreservation. This additional cooling is applied to bring the temperature of the unfrozen portion of the sample down to a temperature just above that of the ice front, for example within 5° C. or less above the temperature of the ice front, or within 2° C. or less above the temperature of the ice front. Without being bound by theory, it is believed that application of this additional cooling can counter any thermal buoyancy effect that might otherwise interfere with the gravitational driven concentration gradient of solute across the sample. In addition, this second cooling can also accelerate the cryopreservation process by accelerating top to bottom ice growth in the sample.

In a preferred embodiment of the second phase cooling, a central rod of partially insulated highly thermally conductive material, such as aluminium, conducts heat throughout the cryoprotectant medium, minimising thermal gradients.

As noted above, in an isothermal system, solutes being excluded from the ice front will result in a more highly concentrated zone of solute in aqueous solution below the ice front i.e. at the ice/unfrozen sample interface. As a high solute concentration is denser than a lower solute concentration system, this high solute area will sink to the base of the sample, i.e. to the base of a sample container under gravity.

It is believed that this gravitational sinking effect may be hindered to a certain extent where a large temperature gradient exists. In a pure water system, the maximum density occurs at +4° C., and any further lowering of temperature results in a lowering of density. In a pure water system where ice is forming from the top of an insulated sample holder, the coldest part of the liquid system will occur at the water-ice interface. Proceeding downwards (i.e. in the direction of increasing gravity) from the ice front, the temperature and density of the water will increase until the maximum density is reached at +4° C. at the base of the sample. The same will be true in a water/solute system, although the temperature of the maximum density will vary by a few degrees depending on the solute and its initial concentration.

A buoyancy effect may potentially counter to a certain extent the concentration driven effect when solutes are present. In more detail, the solute dense zone formed just below the ice surface as solute is excluded from the ice front will be less buoyant due to the high concentration of solutes, but conversely will be more buoyant due to its lower temperature, i.e. because its temperature is below the temperature at which the aqueous solution of cryopreservation medium has its highest density. The size of the temperature gradient, the speed of the ice front, and the solute make-up and concentrations will determine which of these effects predominates.

To ensure maximum freeze-segregation, cooling directed at part of the sample below the top surface of that sample and the ice layer that grows downwards therefrom (the top surface is cooled continuously from initiation of the cryopreservation process) to a temperature just above the freezing point of the solution is thus advantageous because this reduces the temperature gradient across the sample. The cooling directed to the unfrozen portion of the sample below the ice layer can be provided by any appropriate means, for example with a cooling element of a heat engine, a cooling bath, cooling jacket or cooling circuit incorporated in the walls and/or floor of the housing and in thermal contact with the cavity.

This second cooling phase advantageously minimizes any temperature gradient in the sample. As a result, any temperature induced buoyancy effects will be reduced or eliminated and this will enhance the freeze induced segregation of solute and biological material from the ice front. As the solute concentration increases in the liquid component, the freezing point of the remaining liquid will fall and so the temperature of the unfrozen part of the sample can be reduced further to just above the new freezing point. During the cryopreservation process the coldest zone of the sample will be the top surface of the sample and the ice layer that grows downwards from this surface.

In some embodiments the method according to the invention can be performed in a centrifuge. In this case freezing from the top surface, refers to freezing of the sample at the surface of the sample closest to the axis of rotation during centrifugation (i.e. at the point of lowest gravity). In all other cases, freezing at the top surface of the sample refers to freezing across the liquid sample at the gas-liquid interface or, in the case that the liquid level is flush to the roof element of the container or freezing chamber in which it is contained, at the interface between the roof element and the sample. As the roof is located at the vertically uppermost portion of the sample in the static systems, the ice forms at the point of lowest gravity.

In some preferred embodiments a heavy solute as defined above is added to the cryoprotective medium in order to accelerate gravity induced sinking of zones of heavy solute and cryoprotectant.

The freezing point of the solution after ice is formed can be determined automatically by sensing the formation and progression of the ice front at, and from, the top surface of the sample. Sensing can be performed by any suitable means. For example, the sensor could be to detect temperature, optical, or calorimetric readings, or could rely on measurement, for example automatic automatically measurement of the optical (e.g. turbidity) or electrical properties (e.g. conductivity, resistivity etc) of the liquid component of the sample. Accordingly, preferred techniques of the invention may comprise the step of detecting the presence of an ice layer at the top of the sample and its growth downward in the sample. In these techniques a reading indicating the presence of an ice layer at the top of the sample may trigger cooling of the sample below the top surface of the sample to a temperature slightly above, preferably less than 5° C. above the temperature of the ice layer, for example less than 2° C. above, or less than 1° C. above, the temperature of the ice layer growing from the top of the sample.

The techniques of the invention may comprise the step of placing a sample, i.e. a biological material for cryopreservation in a cryopreservation medium, in a freezing chamber. The sample may be introduced directly to the freezing chamber or may be presented in a container. In the instance where the sample is presented in a container, the container may be hermetically sealed. In the instance where the sample is presented in a container, the container may be provided with a liquid input and/or output port and/or a pressure relief valve, the input/output ports being adapted to sealably engage, for example in a push fit manner, with corresponding ports in the apparatus. Any input/output port or pressure relief valve present are generally provided towards the base of the container so that they can function up to the stage where the sample layer containing biological material vitrifies. Any input/output ports can be equipped with a valve to control liquid entry to and exit from the container, such valves can be controlled by a valve control unit, thus allowing a programmed amount of additional CPA or CPM to be introduced in response to readings obtained from a sensor or a plurality of sensors located in the cavity or sample container. This advantageous configuration allows an automated liquidus tracking vitrification to be performed with CPA concentration being modulated in response to readings from a sensor or sensors in the cavity or container. Alternatively, or additionally, the modulation of CPA concentration in the unfrozen portion of the sample can be modified in response to a reading obtained from the sample in accordance with a predetermined algorithm. The same advantages can be derived by equipping the inlet/outlet ports in the apparatus with valves controlled by a valve control unit in which case any valve on the inlet/outlet ports that may be present need not be remotely controlled.

The techniques of the invention can use any suitable cryoprotectant (CPA), for example those commonly used in the cryopreservation methods of the art.

CPAs are used to mitigate some of the stresses experienced by a biological sample in the cryopreservation process. CPAs that are suitable for use in the methods of the invention are water soluble and generally form stable hydrogen bonds with water. The ability of CPAs to form stable hydrogen bonds with water molecules decreases the freezing point of the cryopreservation medium.

The role of the CPA is manifold and depends on the context and concentration of its use. For example, a low molecular weight CPA may enter a cell, i.e. transit a cell membrane, during the cooling process and reduce the tendency for ice nucleation to occur within the cell during cooling. High molecular weight CPAs will not usually cross the cell membrane and accordingly exert their effects in the extracellular milieu of a cell or tissue sample. In lowering the freezing point of the extracellular fluid, a CPA can prevent excessive efflux of water from a cell thereby preventing a cell's shrinkage beyond its minimum critical volume. By reducing cellular retraction, CPAs can attenuate hyperconcentration of intracellular fluid and thereby inhibit the precipitation of protein. Ideally the CPA will be able to perfuse into a biological sample at a sufficient rate to exert its protective effect, the advantageously slow cooling rates of the methods of the present invention, compared to the vitrification methods of the prior art in which cooling rates of 10,000° C. per minute are common, allows for progressive perfusion during the cooling phase of the cryopreservation process. CPAs can also prevent generation of excessive salt concentrations during the freezing process that can be toxic to the cell. In the cryopreservation medium the relative concentration of the solute (i.e. the CPA) will increase as the solvent (water) in which it is dissolved solidifies (freezes).

Any suitable CPA or combination of CPAs may be used in the methods of the invention. Examples of well known CPAs that may be used alone or in combination in the methods of the invention are dimethyl sulfoxide, formamide, acetamide, C1-C3 alcohols, 1,2-isopropyldiol, 1,2-propanediol, ethylene glycol, propylene glycol, glycerol, glucose, mono-saccharides, disaccharides (for example sucrose, trehalose, lactose), polysaccharides (for example raffinose, dextran), ficoll, polyethylene glycol and polyvinylpyrrollidine. The selection of CPA will be dependent to a certain extent on the nature of the sample to be cryopreserved. Thus transmission of the CPA across a cell membrane will not be an important consideration when preserving protein samples whereas for preservation of cells, tissues and engineered tissue constructs this will be a greater factor. Likewise, it will be apparent to the skilled person that the ability of a CPA to perfuse/diffuse into a sample is more important for tissue samples relative to isolated cells.

Typically, the concentration of the CPA or the sum of concentrations of CPAs in the cryopreservation medium in the methods of the invention before cooling commences is less than or equal to 50% (w/v) and usually less than or equal to 40% (w/v), for example from 10% to 40% (w/v). At concentrations below 10% of the CPA ice nucleation becomes a more significant factor whereas at concentrations of the CPA higher than 50% vitrification cannot be assured. Some heavy solutes can be added to the cryopreservation medium in order to accelerate gravity assisted segregation.

Examples of cryoprotective agents that can be used in methods of the invention include, but are not limited to, low molecular weight (Mr<400) CPAs that can cross cell membranes are alcohols such as methanol, ethanol, 1,2-isopropyldiol, 1,2-propanediol, glycerol, ethylene glycol, formamide, acetamide and dimethylsulfoxide and higher molecular weight and/or non-penetrating CPAs such as monosaccharides (for example glucose), disaccharides (for example sucrose, trehalose, lactose), polysaccharides (raffinose, dextran), ficoll, polyethyleneglycol, polyvinylpyrrolidinone, proteins, and foetal bovine serum. Particularly preferred CPAs are DMSO, glycerol, glucose, propylene glycol, and polyethylene glycol. In some preferred embodiments a mixture of CPAs may be used. For example, a low molecular weight CPA such as DMSO can be used in conjunction with a non-penetrating CPA such as a carbohydrate to deliver optimal cryopreservation for a biological sample.

DMSO is an example of a preferred CPA for use in the methods according to the invention. If DMSO is used in the methods according to the invention the initial cryopreservation medium will typically be a homogeneous medium. Accordingly, an aqueous solution containing 10% DMSO by volume may be used in a method according to the invention as the cryopreservation medium. In this case, as will be appreciated, the ice-growth during the process removes water from the cryopreservation medium and the concentration of DMSO in the liquid part of the sample gradually increases from the initial 10% value. As the method progresses the increasingly concentrated (and dense) aqueous DMSO solution will depress the freezing point of the liquid layer and will favour segregation of the solute DMSO from the ice front. At the same time transfer of DMSO across any cell membranes will be favoured and the cryoprotectant effect of DMSO in inhibiting inter- and intra-cellular ice formation can be fully expressed, thus preventing or substantially reducing damage to sensitive structures in the biological material such as cell membranes that are associated with the shear stresses of ice crystal growth. DMSO can also increase the glass temperature and thus allows vitrification to proceed at a higher temperature than would otherwise be the case.

Use of a carbohydrate as a CPA (e.g. a sugar CPA) can be advantageous as density effects in solution of these CPAs are especially good for driving the gravitational segregation of sample and solute at the ice front. Preferred heavy solutes include soluble salts of halogens.

In some embodiments the methods of the invention may further comprise agitation of the cryopreservation medium during cooling to assist solute diffusion into or out of the biological sample material or to homogenise the cryopreservation medium. Agitation of the sample may involve stirring, shaking or sonication of the sample.

In some embodiments the methods of the invention can comprise the step of adding extra solute into the sample during cooling to further increase the concentration of CPA in the cryopreservation medium during cooling. For example, a 50% aqueous solution of DMSO could be added to the cryopreservation medium in place of a corresponding amount of liquid cryopreservation medium with a lower concentration of DMSO (or an alternative CPA, or a mixture of CPAs). This solute addition can be by single or multiple injection, e.g. through an injection port with a corresponding volume of cryopreservation medium being ejected or otherwise withdrawn through an exit port. Alternatively, the solute addition could be performed at a constant or variable rate to further vary the CPA concentration. Multiple or continuous injection of additional solute can be used in a liquidus tracking type method such that the concentration of CPA is increased as a function of the decreasing sample temperature. This liquidus tracking approach advantageously allows high concentration of solutes that would be toxic at ambient temperatures to be used as at lower temperatures any intrinsic toxic effect that the CPA might express will be reduced or eliminated. The introduction of additional CPA can be programmed in response to the reduction in temperature of the ice layer in the sample or the unfrozen layer of the sample. Thus cooling can proceed via a preset cooling algorithm to deliver an optimally preserved sample.

In some embodiments the methods according to the invention may comprise the step of applying or relieving pressure in the freezing chamber. This can avoid the risk of any damage or rupture to the freezing chamber that might otherwise occur as a result of volume changes in the sample on freezing and cooling. The pressure relief can be achieved via any suitable means, for example by bleeding liquid from the freezing chamber via a valve (e.g. a pressure relief valve or injection/ejection port (i.e. an input/output port) or via use of a piston arrangement attached to the freezing chamber configured to maintain a constant pressure therein.

In some embodiments the methods according to the invention comprise the step of vitrifying a biological sample in a vial or a plurality of vials or a multi-well plate located at, or detachably attached to, the base of the sample container. In the methods where a sample vial or multi-well plate is attached to the base of the sample container, the vial or multi-well plate containing a vitrified sample at the end of the cryopreservation process may be detached for storage after the cryopreservation process is complete.

The rate of temperature reduction of the sample in the methods of the invention is selected to facilitate diffusion of the cryoprotectant into the biological sample. A nonlinear cooling profile that allows sufficient time for diffusion of CPA into the biological material at low temperatures is generally preferred. The appropriate time/temperature profile can be calculated from physical parameters such as cryoprotectant concentration, diffusion coefficient of the sample, the dimensions of the sample and the viscosity of the CPM at a given temperature. At low temperatures very high viscosity will be encountered and it is likely that diffusion will become limited by the boundary conditions of the biological sample and the freeze concentrated solution and mixing may be implemented to increase diffusion. In general, the rates of cooling of the sample in the methods according to the invention are relatively slow, and much slower than in conventional vitrification approaches, for example between 0.1 and 2° C. per minute, and preferably less than 0.5° C. per minute.

The invention also relates to biological samples cryopreserved by the methods of the invention for example biopsies or other tissues, artificial tissue constructs, proteins, antibodies, or cells. The resultant samples can be subjected to further processing, for example freeze-drying prior to final storage, and this can advantageously deliver freeze dried materials superior to those obtainable by conventional methods and/or at a lower cost than those obtained by conventional methods.

The invention also provides apparatus for carrying out a cryopreservation method according to the invention.

The apparatus according to the invention comprises a housing, the housing comprising a cavity and a primary cooling element that is incorporated in the roof of the housing. The primary cooling element is in thermal contact with the top surface of the cavity, and preferably extends substantially or completely across the entire upper surface of the cavity. For example, the thermal contact may be a metal plate spanning the upper surface of the cavity in the housing. In some embodiments, the housing may have the general form of a cup (i.e. with a floor and walls projecting upwards therefrom) provided with a lid (the roof), with the lid comprising a cooling element. The shape of the cup will determine if there is a single wall (e.g. a curved wall) or a plurality of walls.

The primary cooling element of the apparatus removes heat energy from the sample via the uppermost surface of the sample, thereby cooling the uppermost surface of a biological sample placed within the cavity and consequently causing an ice layer to form on that surface. In some embodiments the primary cooling element can be an active cooling element such as a heat pump, for example a Stirling engine. In some embodiments heat extraction from the top surface of a biological sample located in the cavity can be conducted to, and absorbed by, a phase transition in a material such as liquid nitrogen thus cooling the uppermost surface of a biological sample and causing ice formation thereon. In some embodiments a central rod is connected, either permanently or magnetically to the primary cooling element to induce nucleation, allow a surface for ice to grow down away from the edge of the sample container, and to homogenise temperatures throughout the sample.

Cooling could also be provided through a commercially available cooling circulating bath system, where a cold liquid is used to deliver cooling from a compression cooler. In addition, a Peltier engine system could be employed.

A sample of biological material in a cryopreservation medium can be introduced directly into the cavity by opening a loading door provided in the housing, i.e. in the roof, floor or wall(s) of the housing. Alternatively, the sample of biological material in a cryopreservation medium can be contained in a container, i.e. a sample container, and the sample container can be introduced into the cavity via a loading door provided in the housing. The loading door can in some embodiments span the entire area of the roof or floor.

In embodiments where the sample is introduced directly into the cavity, the cavity is formed to prevent any unwanted escape or ingress of liquid from the sample during cryopreservation. In embodiments where the sample is introduced in a sample container, the sample container or optionally a portion thereof, can be conveniently removed from the cavity at the end of the cryopreservation for long term storage.

The housing is preferably insulated to allow efficient cooling of the sample during cryopreservation and to allow low temperatures to be produced in the sample. Use of an uninsulated housing would require a relatively high power cooling element and would compromise the efficiency of the cryopreservation process.

In some embodiments the housing comprises one or more sensors configured to provide a reading on the physical condition of a sample located in the cavity during the cryopreservation process. For example, one or more thermocouple sensors may be present to allow monitoring of the temperature at one or more point along the vertical axis of the sample. The temperature reading obtained from one or more sensors can be used to monitor the progression of the ice front down the sample or to establish whether vitrification has occurred in the portion of the sample below the ice front. As a further example, a combination of a light source and a photosensor can be used to monitor the establishment of an ice front and its position in the sample. As a further example, sensors to detect changes in the conductivity or resistivity of the sample may be used to provide information on, for example, the concentration of solute in the liquid portion of the sample as the cryopreservation process proceeds. As a yet further example, the sensor may be a pressure sensor and could be used to sense pressure changes within the sample or housing.

In embodiments wherein the sample is to be presented (i.e. introduced and contained within) in a container that locates within the cavity, the housing can additionally or alternatively feature one or more conductive contacts to contact with sensors located within the container. Sensors located within the container may be of the type that would otherwise be used in the housing in the absence of a container (e.g. thermocouples, photosensors, electrodes or pressure sensors). For example, the sample container may be provided with electrodes that enable conductivity or resistivity readings to be obtained or with thermocouples that allow the temperature of the sample in the container to be determined.

In some embodiments the apparatus comprises a piston connected to the housing configured to ensure a steady pressure within the sample during the cryopreservation process and/or to compensate for any volume change resulting from changes in temperature and phase within the sample. In embodiments where the apparatus comprises a piston, the piston can conveniently be located on the roof of, or the floor of, the housing. For example, the piston may be configured to cause the roof, or a portion thereof, to move away from, or towards, the floor of the housing in response to a pressure change within the sample thus restoring the pressure in the housing to its initial value. The piston may also be used to place the sample under an increased pressure at the start of the cryopreservation process or ensure good thermal contact between the cooling element in the roof of the housing and the sample located within the cavity in the housing by applying a biasing force. Other suitable biasing means may be applied to equilibrate pressure or to ensure good thermal contact between the sample, for example a sample in a sample container and the primary cooling element.

In some preferred embodiments, the housing can be provided with input and/or output ports to allow for the addition or removal of e.g. fluid from the cavity or a sample container located therein. These input and/or output ports can be provided to allow input of additional biological material or CPA into the sample during cryopreservation or removal of excess liquid during cryopreservation or to allow perfusion of vasculature or organs during the cryopreservation process. Thus in some preferred embodiments the apparatus will be provided with perfusion means, e.g. a pump to introduce, remove or establish a flow of sterile perfusate through an organ or its vasculature that is provided in the sample. The input and output ports are preferable equipped with a valve or tap to control the rate of input or output of matter into the cavity or a sample container located therein.

In the instance wherein the sample is presented in a sample container, input and/or output ports on the sample container can sealably engage with complementary liquid input/output ports in the apparatus according to the invention. The term sealably engage means that the input/output ports of the sample container and the apparatus engage in such a manner that fluid can flow into the sample container without undesired leakage. For example, the input/output ports on the container may engage with corresponding input/output ports on the container by a push fit connection.

The apparatus according to the invention can be provided with a control unit and a pump unit such that introduction of additional CPA in to the sample during the cryopreservation process can be automatically triggered in response to a reading from a sensor, for example a thermocouple, located in the cavity, for example in a sample container located therein. The process of liquidus tracking can thus be performed by feedback from one or more sensors in the cavity (i.e. the freezing chamber) and/or the sample container. As will be appreciated a central control unit can perform multiple control functions, for example the cooling provided by the primary and, if present, the secondary cooling element can be controlled as well as the rate and timing of introduction of any additional cryoprotectant to the unfrozen portion of the sample. The control unit may comprise a processor to process signals received from sensors, a memory element to store programmes and algorithm for vitrification protocols, for example dependent on the initial CPA concentration/concentrations or the nature of the sample.

The cavity, or the sample container for location therein, may comprise a platform, for example a liquid permeable platform such as a membrane or mesh to retain the biological sample above the floor of the cavity or sample container as appropriate to the manner in which the sample is presented. This can, for example, allow removal of cryopreservation medium without removal of biological material in cases where the biological material is suspended in the cryopreservation medium and this can be advantageous in for example liquidus tracking cryopreservation methods. In addition, the platform ensures that the biological material is kept off the base of the cavity or the sample container and accordingly ensures that the biological material is encapsulated within a vitrified matrix of cryopreservation medium.

In some embodiments the apparatus is provided with agitation means to homogenise the liquid concentration in a sample located therein, and/or to assist with solute diffusion into or out of the biological material in a sample located therein. The agitation means may be a stirrer, either a mechanical or magnetic stirrer, or a vibration plate, or sonic agitation means for example an ultrasonic source. In the instance wherein a magnetic stirrer is present, a magnetic follower in the cavity or sample container will be present, and in such embodiments the magnetic follower is preferably located under a platform as described above in the cavity or sample container.

In any of the above embodiments the cavity can be provided with attachment points on its floor or wall at attach to enable fixing of a sample container in the cavity via complementary attachment points on the sample container. Similar attachment points can also be provided in the roof of the cavity.

In any of the above embodiments, the apparatus may further comprise a secondary cooling element. The secondary cooling element is arranged in the housing to supply cooling to a portion of the cavity below the roof. In use the secondary cooling element cools the unfrozen portion of the sample once an ice layer forms on the top surface of the sample. The secondary cooling element may be configured to operate once a sensor reading is obtained that indicates that an ice layer has formed on the surface of the sample. A control unit can be provided to control the cooling applied by the secondary cooling element such that in use the secondary cooling element cools the unfrozen portion of the sample to a temperature just above the temperature of the ice layer at the top of the sample.

The apparatus according to the invention may also comprise heating means, for example an electrical resistance heating element, adapted to thaw a sample cryopreserved by the techniques according to the invention.

The heating means can be integrated in the roof, floor or walls of the cavity of the cryopreservation apparatus. In use, the heating means are used to deliver heat to the vitrified layer of the sample. Sensors in the apparatus can provided to a control unit that, in response to a reading from at least one sensor, can control the rate at which the cryopreserved sample is warmed to minimise the risk of ice formation in the sample. For example, an electrical resistance heating element can be integrated into the roof of the cavity for use in controlled warming of a cryopreserved sample in a sample container. In this case the sample container can be attached to the roof of the cavity such that the vitrified layer of the sample, i.e. the layer below the ice front in the vitrification process, is placed in thermal contact with the roof of the cavity. Heating of the sample can then proceed in a controlled manner to deliver a thawed sample ready for use or analysis. The warming element may also be used in conjunction with a cooling system during cryopreservation to more sensitively control cooling rates.

So that the invention may be better understood an example of an apparatus for performing the cryopreservation methods of the invention in unloaded (FIG. 1) and loaded operating state (FIG. 2) are described below. As will be appreciated by the person of skill in the art, the simple schematic cross section views are provided by way of example only and in no way limit the scope of the invention.

EXAMPLES

Figure 1:
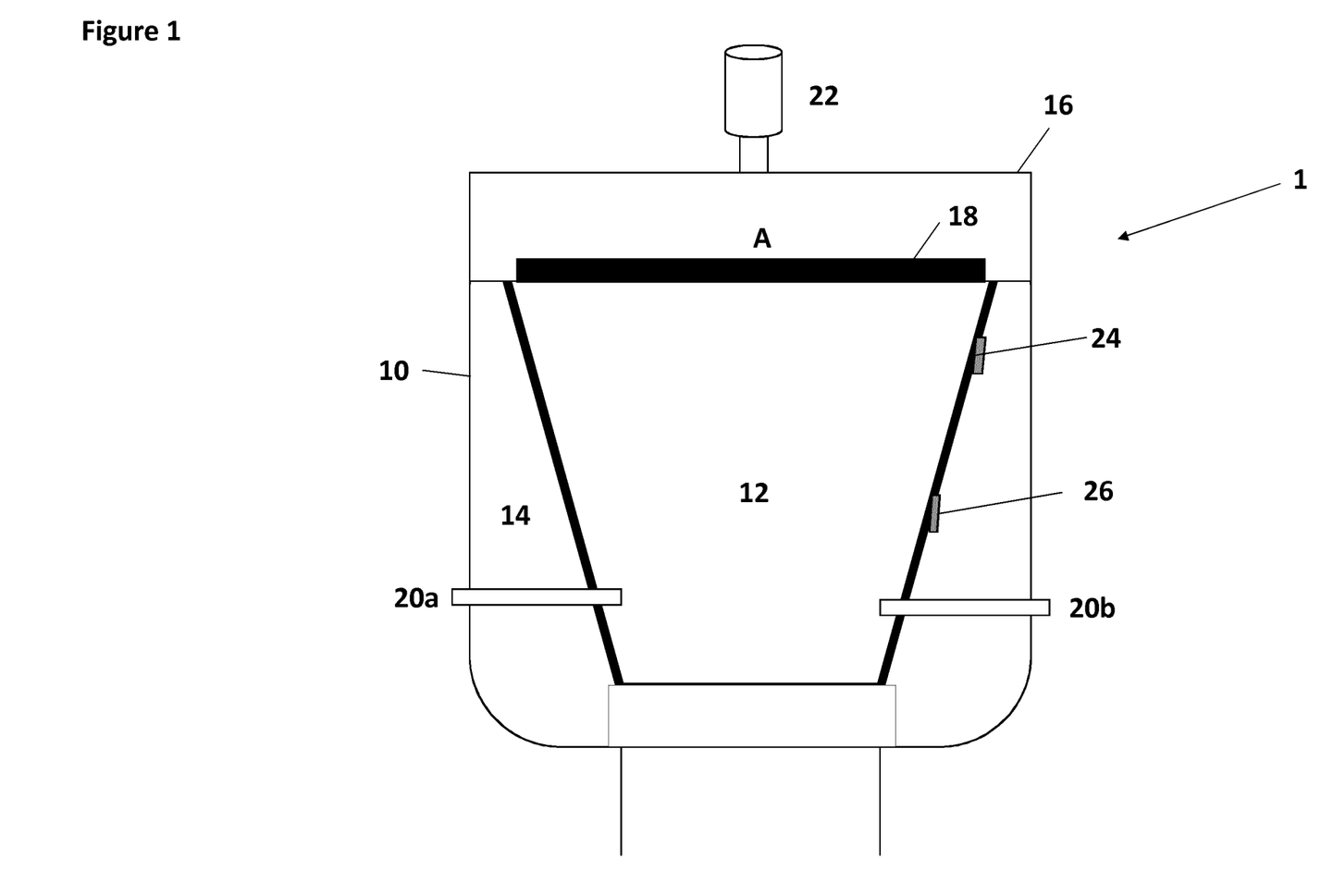
FIG. 1 shows a cross sectional view of an apparatus.

FIG. 1 shows a cross sectional view of an apparatus 1 in which the cryopreservation methods according to the invention can be performed. The apparatus comprises a housing 10 in which is located a cavity 12 defined by the body 14 of the housing and its roof 16. A primary cooling element 18, for example a cold plate, is incorporated in the roof 16 and is in thermal contact with the chamber. The extent of cooling provided by the cooling element to the cavity, for example to a sample located therein can be controlled by a control unit (not shown). In FIG. 1, the device is provided with input 20a and output ports 20b for the introduction or removal of fluids from the chamber, although not shown these ports are equipped with valves to control fluid flow to, and from, the cavity 12 or a container (not shown) located therein. The ports 20 can also sealably engage with a sample container located within the cavity (not shown) in which a biological sample in a cryopreservation medium can be provided and within which a cryopreserved sample can be removed from the cavity for storage. In the apparatus of FIG. 1, a piston 22 configured to regulate the pressure within the cavity during cryopreservation is present.

Although not shown, the body 14 is normally insulated to avoid excessive heat loss from the cavity during vitrification, thus allowing efficient device performance. The body 14 may also be provided with a secondary cooling element to provide cooling to the section of cavity below the roof section. The secondary cooling element may be a cooled liquid circuit, a cooling bath or any other suitable cooling element. The secondary cooling provided by the secondary cooling element is controllable, thus allowing ice to form and then grow downwards exclusively from the area of a sample adjacent the primary cooling element in the roof. Sensors 24, and 26 may be provided in the cavity to detect the status of the sample within the cavity. Exemplary sensors include thermocouples to provide direct temperature readings from the sample or photodiodes coupled to a light source to provide feedback on the downward progression of an ice front in a sample.

Figure 2:
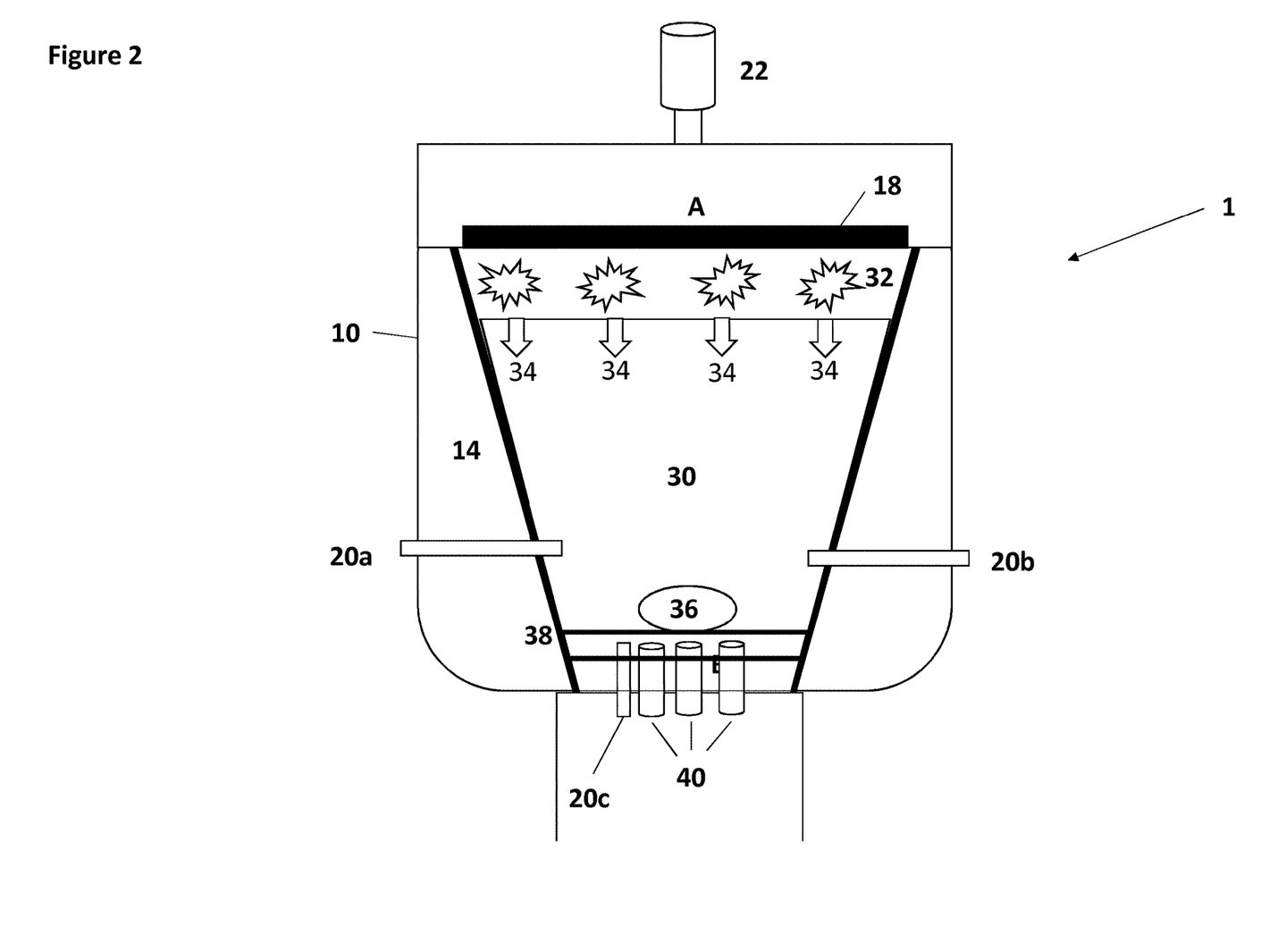
FIG. 2 shows a cross sectional view of an apparatus with a sample undergoing cryopreservation located in the housing.

FIG. 2 is a cross section of a similar apparatus 1 in which a sample of biological material in unfrozen cryopreservation medium 30 located in the cavity is undergoing cryopreservation, an ice front 32 having been established at the top of the sample adjacent the primary cooling element 18 located in the roof 16 of the housing 10. The direction of ice growth during cryopreservation is indicated by the arrows 34. The biological sample may be present as a solid, such as a tissue sample 36 retained on a permeable shelf 38. Alternatively, the sample may be in solution and may be introduced in vials 40 that sealably engage with the base of the cavity or with a sample container (not shown) located within the cavity. An inlet/outlet port 20c is provided to compliment the inlet outlet ports 20a and 20b.

In operation a sample of biological material in a cryopreservation medium is loaded into the cavity defined by the housing body 14 and roof 16, optionally within a sample container that is shaped to provide good thermal contact with the primary cooling element 18 located in the roof 16 and any secondary cooling element located in the walls or base of the housing 10. Cooling to the sample is first provided by the primary cooling element 18 causing an ice front 32 to develop at the top of the sample. Solute (i.e. CPA) and sample are excluded from the ice front 32 and fall under gravity towards the base of the housing due to the increased density of the solute enriched ice below the ice.

Once an ice front 32 is established at the top of the sample, secondary cooling via a secondary cooling element located in the walls or floor of the housing 10 can be activated and the secondary cooling is controlled to cool the portion of the sample 30 below the ice front 32 to a temperature slightly above that of the ice front 32. The cooling provided by the cooling elements is controlled by a control unit and can be regulated in response to feedback from sensors located on the cavity walls or in a sample container (if present) located in the cavity. Cooling progresses until the temperature of the unfrozen layer 30 below the ice front 32 descends below the glass transition temperature of the residual unfrozen cryopreservation medium, on continued cooling this layer vitrifies, i.e. solidifies as a glass, rather than freezing. Input/output ports 20a, 20b, 20c allow additional cryoprotectant to be introduced in a portionwise and progressive manner, thus allowing a practical liquidus tracking cryopreservation technique to be performed. The vitrified biological sample can be located on a permeable shelf 38 (if present) or in vials 40 at the base of the sample.

Figure 3:
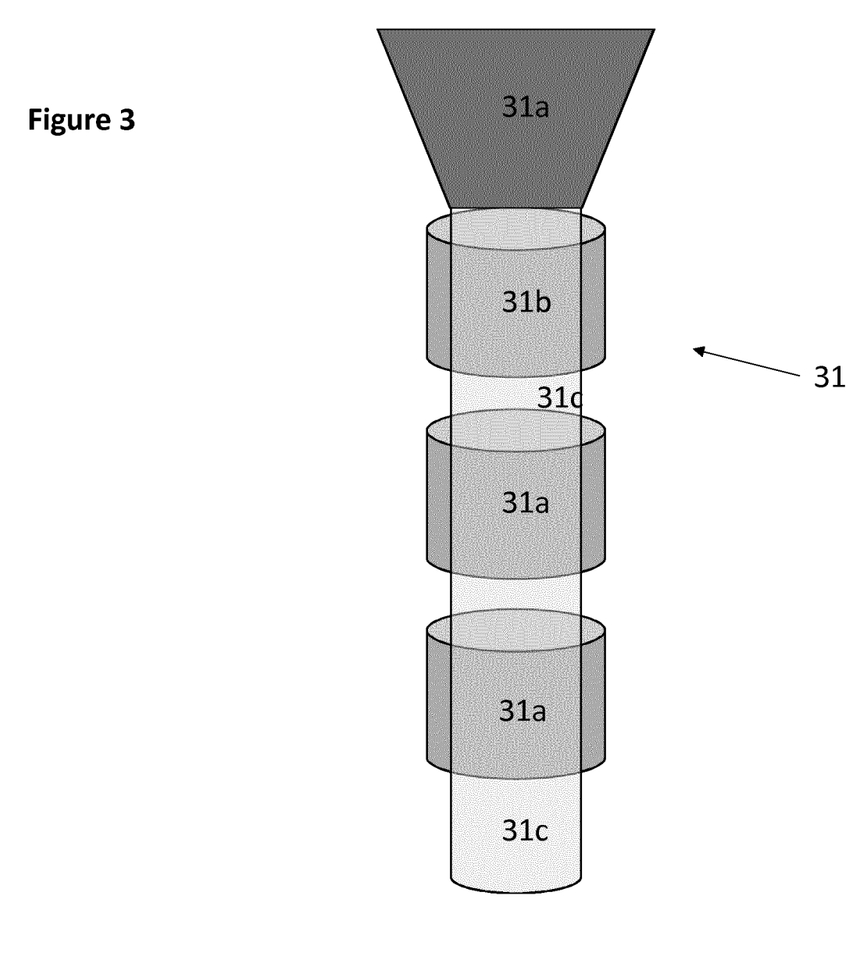
FIG. 3 shows an example of a thermally conductive member in the form of a central rod for the conduction and homogenisation of heat throughout the cryopreservation medium.

FIG. 3 shows a preferred embodiment of the thermally conductive member, in this case in the form of a central rod 31 used for conduction of heat and homogenisation of temperature throughout the culture medium. The central rod 31 is thermally connected to a Stirling engine or other cooling source through use of collar 31a. This collar can be constructed of a semi-conductive material such as sintered metal, potentially including a smooth covering to aid in cleaning and for ice nucleation. The core 31c of the central rod is constructed of a thermally conductive material, such as aluminium, or an aluminium alloy. In a preferred embodiment, there is insulation 31b at intervals along the core 31c to ensure equal conduction at discrete steps of the rod. In other embodiments a continuous insulation material of varying thickness could be used to achieve a similar affect on the sample.

Figure 4:
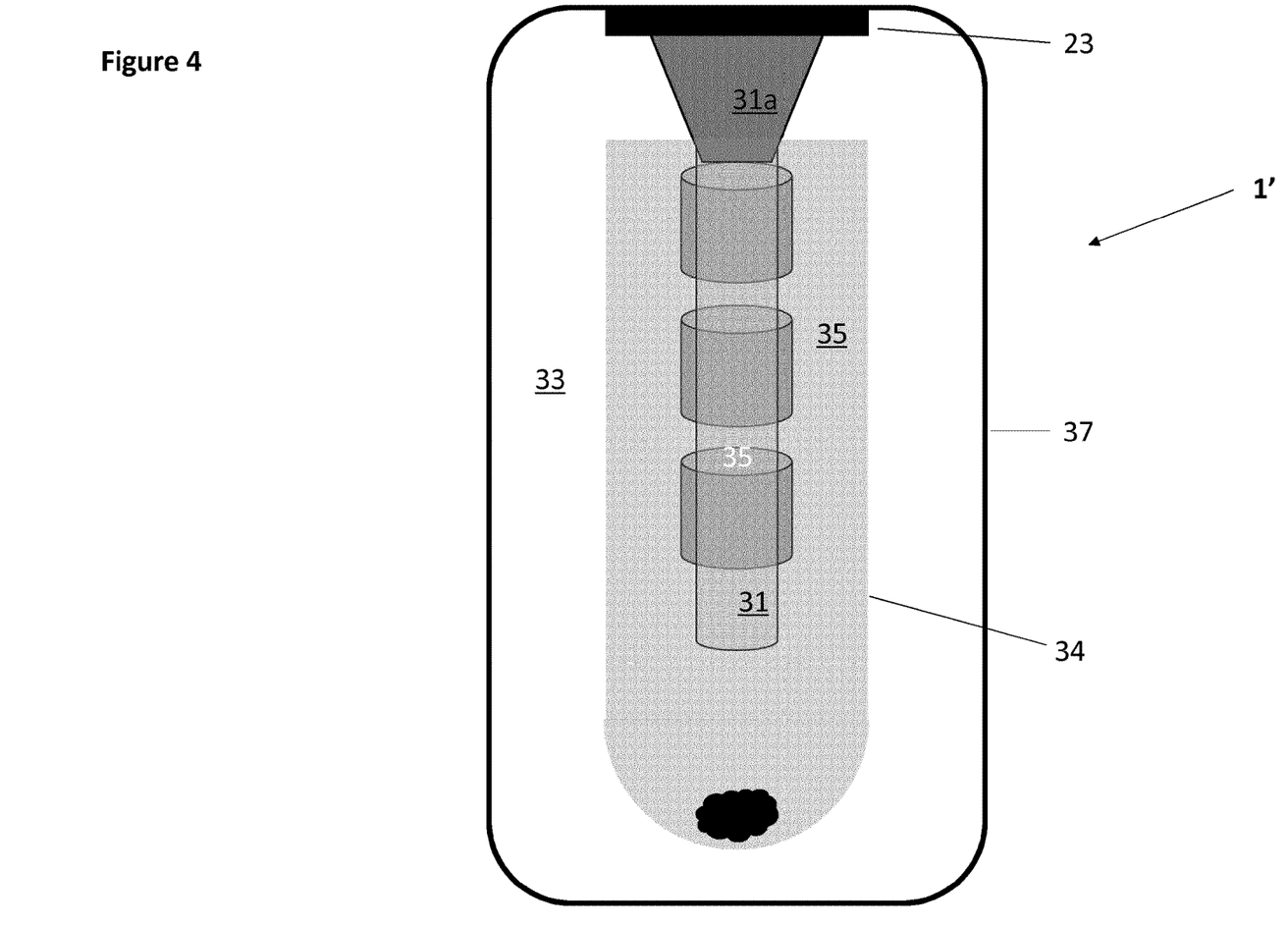
FIG. 4 shows a preferred apparatus using the central rod.

FIG. 4 shows a further embodiment showing apparatus 1' which is a modified version of the apparatus 1 described above where the central rod 31 is deployed within a sample cavity 34, in turn held in housing 37, which includes thermal insulation 33, for example a vacuum or partial vacuum. The central rod is connected to the stirling engine 22 or other cooling source, and placed into the sample cavity 34. The cavity is filled or partially filled with a cryopreservation medium 35. Biological material 36 is placed or held at the base of this medium, and as cooling commences principally via the rod 31, liquid at the base surrounding the biological material will initially remain in a liquid state and can be operable as described above with reference to FIGS. 1 and 2.

It should be understood that examples only of the invention have been described above and illustrated, and that various improvements, modifications, variants, and omissions are possible to those examples without departing from the scope of the invention defined herein, the technical features of which are claimed.

The invention claimed is:

1. A method for cryopreservation of an initially liquid sample comprising a biological material in a cryopreservation medium, the method comprising the step of cooling the top surface of the sample to selectively form an ice layer at the top surface of the sample, and further cooling the sample to provide formation of ice from said ice layer at the top surface progressively downwardly toward a base of the sample whereat the biological material is substantially located or concentrated; wherein the cooling applied the top surface of the sample is continued until a layer of the sample below the ice layer solidifies as a glass to form a vitrified, or amorphous solid, layer as a result of cooling below the glass transition temperature, wherein the cryopreservation medium is an aqueous solution comprising at least one cryoprotectant.

2. The method according to claim 1, further comprising the step of cooling a layer of the sample below the ice layer to a temperature just above that of the ice layer of less than 5° C. above that of the ice layer.

3. The method according to claim 1, wherein the at least one cryoprotectant is selected from the group consisting of dimethyl sulfoxide, formamide, acetamide, C1-C3 alcohols, 1,2-isopropyldiol, 1,2-propanediol, ethylene glycol, propylene glycol, glycerol, glucose, mono-saccharides, disaccharides, sucrose, trehalose, lactose, polysaccharides, raffinose, dextran, ficoll, polyethylene glycol and polyvinylpyrollidine.

4. The method according to claim 1, wherein the cryopreservation medium further comprises DMSO, or a sugar, or a combination of DMSO and a sugar.

5. The method according to claim 1, further comprising the step of adding additional cryoprotectant to the layer of the sample below the ice layer after the ice front on the top surface of the sample has formed.

6. The method according to claim 5, wherein the additional cryoprotectant is added in a progressive fashion as a function of the decrease in temperature of the ice layer or the sample liquid below the ice layer.

7. The method according to claim 1, wherein a mechanical agitation is applied to the sample during cooling.

8. The method according to claim 1, wherein cooling is provided by thermal conduction through a cooling element in the form of a heat conducting member located within the sample.

9. A cryopreservation apparatus for performing a cryopreservation method according to claim 1.

10. The apparatus according to claim 9, comprising a housing, the housing comprising a cavity and a primary cooling element that is incorporated in the roof of the housing above the cavity.

11. The apparatus according to claim 9, wherein the housing is insulated by a vacuum or partial vacuum.

12. The apparatus according to claim 9, further wherein the degree of cooling provided by the primary cooling element can be controlled manually or automatically by a control unit.

13. The apparatus according to claim 9, further comprising at least one sensor adapted to provide a signal characteristic of the physical condition of a sample located in the cavity.

14. The apparatus according to claim 13, wherein the at least one sensor adapted to provide a signal characteristic of the physical condition of a sample located in the cavity is electrically connected to a control unit, wherein the signal indicates the presence of an ice layer in, or the temperature of, a sample located in the cavity.

15. The apparatus according to claim 10, wherein the cavity comprises one or more liquid inlet and/or outlet ports.

16. The apparatus according to claim 15, comprising a pump configured to supply fluid to an inlet port or draw fluid from an outlet port.

17. The apparatus according to claim 16, wherein fluid flow to an inlet port or from an outlet port is controlled by a control unit in response to a signal received from a sensor located in the cavity.

18. The apparatus according to claim 9, comprising means for mechanically agitating any sample located within the cavity.

19. The apparatus according to claim 9, comprising a secondary cooling element adapted to cool a section of the wall(s) or floor of the cavity.

20. A cryopreserved sample obtained by a method according to claim 1.

21. The cryopreserved sample according to claim 20, wherein the sample is a tissue sample, a biopsy, an organ or a tissue construct.

22. A sample container for use in cryopreservation in an apparatus according to claim 9.

23. The apparatus according to claim 9, further comprising at least one cooling member located to be in contact with sample liquids in the cavity arranged to homogenise thermal gradients within the sample.

24. The apparatus according to claim 23, wherein the member includes at least one rod of heat conductive material surrounded by one or more discrete bands of material which is less thermally conductive than the rod.

25. The apparatus according to claim 24, wherein multiple rods are used.

26. The method according to claim 1, wherein a solute or combination of solutes with density >2 g per cm$^3$, solubility of >0.5 g/cml water at 4° C. are used with concentration >5% w/v.

* * * * *